July 18, 1950      S. D. STOOKEY      2,515,940

PHOTOSENSITIVE OPAL GLASS

Filed Sept. 9, 1946

INVENTOR.
STANLEY DONALD STOOKEY
BY F. H. Knight
ATTORNEY

Patented July 18, 1950

UNITED STATES PATENT OFFICE 2,515,940

PHOTOSENSITIVE OPAL GLASS

Stanley Donald Stookey, Corning, N. Y., assignor to Corning Glass Works, Corning, N. Y., a corporation of New York Application September 9, 1946, Serial No. 695,801

21 Claims. (Cl. 49—92)

This invention relates to photosensitive glasses, that is, glasses in which exposure to short wave radiations, 400 millimicrons or less, brings about an invisible change as a result of which irradiated areas are capable of heat developed coloration while non-irradiated areas remain substantially unchanged on heating.

In pending applications, Serial Numbers 513,441, 513,443, and 513,444 filed December 8, 1943, there are described colorless photosensitive glasses in which a colored photographic image may be formed by exposure through a suitable negative followed by heating the glass. In the glasses so treated the contrast betwen high lights and low lights is a variation in the density of the color of the light-affected areas of the glass.

In my pending application, Serial Number 513,445, filed December 8, 1943, I have described colorless photosensitive glasses in which a colored photographic image likewise may be formed and developed by suitable exposure through a negative and subsequent heating, but which become opacified throughout during heating to provide a white opaque background for the colored image.

The primary object of this invention is to provide photosensitive glasses in which only the developed image is opaque or glasses in which light-affected areas become opacified on heating while unexposed areas with the same heat treatment remain clear and unchanged.

Another object is to provide colorless photosensitive glasses in which the developed image is both opaque and colored while unexposed areas remain clear and unchanged during heating.

I have discovered new photosensitive glass compositions in which selective irradiation and subsequent heating produce in the glass an opaque image by the differential precipitation of either lithium disilicate or barium disilicate in the irradiated areas during heating. To cause such selective precipitation of the opacifying disilicate particles it is necessary to incorporate into the glass one of the photosensitizing metals, gold, silver or copper, employed in the glasses of the above mentioned patent applications. These make the glass sensitive to short wave radiations and on subsequent heating of the glass they provide colloidal nuclei for the formation and growth of the opacifying crystallites. In another application Serial Number 695,802, filed by me concurrently herewith, I have described and claimed photosensitive glasses and articles in which the image forming crystallites are barium disilicate. The present application is specifically directed to glasses and articles in which photographic images are formed by the differential precipitation of lithium disilicate.

The glasses of the present invention are silicate glasses containing 10% to 25% $Li_2O$ and a small amount of one of the photosensitive metals, gold, silver or copper. These glasses preferably but not essentially contain up to 35% of BaO or up to 10% of another oxide of the second periodic group or up to 10% $Al_2O_3$ or up to 10% of another alkali metal oxide or combinations thereof. Compositions containing both $Li_2O$ and BaO preferably comprise 55% to 75% $SiO_2$, 10% to 25% $Li_2O$ and 3% to 35% BaO to which is added a small amount of a salt or oxide of gold, silver or copper as a sensitizing metal. In glasses of the above mentioned compositions containing both $Li_2O$ and BaO, some barium disilicate may also be precipitated but lithium disilicate is always formed as the chief opacifying agent.

The new glasses are transparent and uncolored by the sensitizing metal when fabricated, but when exposed to short wave radiations and subsequently heated the exposed areas become opacified by the precipitation of lithium disilicate while the unexposed areas remain clear. The minimum amounts of the sensitizing metals which are effective to induce opacification of the exposed areas are equivalent on the oxide basis to .004% of gold computed as Au, .025% of silver computed as AgCl and .04% of copper computed as $Cu_2O$ respectively. The opacification of the exposed areas is progressively intensified by increasing the amounts of the sensitizing metals up to maximum amounts which are equivalent on the oxide basis to about .05% of gold computed as Au, .3% of silver computed as AgCl and 1% of copper computed as CuO. Maximum opacification is also produced by still larger amounts, but their use is impractical for economic reasons. The exposed and opacified areas may be colored by the sensitizing metals if sufficient amounts within the above recited ranges are used and if the irradiation and subsequent heat treatment of the glass are sufficiently intense or prolonged, as will later appear. The colors obtained through the use of gold may vary from blue through lavender and pink to red; silver produces a yellow or brown coloration, and a red or reddish brown may be obtained with copper. Under conditions which produce coloration, the opacification of the irradiated areas of the glass occurs subsequent to their coloration.

In general, the use of the sensitizing metals gold, silver and copper, in the new glasses is subject to the same considerations and limitations which attend their use in the glasses disclosed in the pending applications above referred to. Reducing agents prevent photosensitivity in gold and silver containing glasses but not in copper containing glasses. In all cases, photosensitivity is prevented or objectionably diminished by the presence of substantial amounts of compounds of arsenic, lead, thallium, vanadium, uranium, iron, manganese or selenium. As the sensitizing metal, gold is preferable and is introduced into the batch as a solution of gold in acid to form gold chloride.

Cerium in small amounts intensifies the photosensitivity of glasses containing either gold or silver or copper, that is, it increases the effect of a given exposure or shortens the time of exposure necessary to produce a given effect. In large amounts, it decreases or prevents the photosensitivity of the glass. The maximum intensifying effect of cerium occurs in glasses containing about .04% $CeO_2$ and not more than .05% $CeO_2$ should be employed.

In glasses containing gold, the addition of up to .03% $SnO_2$ or $Sb_2O_3$ tends to prevent a blue and to permit only a red coloration to develop in the surface of the irradiated area of the glass during heating. The development of opacity in the same area subsequently occurs only below the surface where the glass has not become red. This results in a transparent red image superimposed on a white opaque image. The density of the coloration in the presence of $SnO_2$ or $Sb_2O_3$ increases with increasing gold content and the depth to which the coloration extends or penetrates into the glass increases with increasing time of exposure of the glass to short wave radiations.

Coloration of the irradiated areas of the glass by the sensitizing metal during heating may be prevented by using an amount of the metal too small to produce coloration, though sufficient to produce opacification, or by employing larger amounts of the metal and using an exposure time or intensity sufficient to bring about opacification but insufficient to permit a visible coloration to develop on heating. Such exposure conditions vary with different compositions but may readily be determined by trial. The temperature for the development of opacification is somewhat higher in a given glass than for the development of the color of the sensitizing metal and is about 100° C. or less below the softening point of the glass. Coloration without opacification may therefore be produced by using temperatures high enough to cause coloration of the exposed areas but not high enough to cause opacification thereof.

From the foregoing description it will be seen that various effects can be produced by means of the invention. Such effects include white opacified images or designs, colored opacified images or designs, and a colored but unopacified image or design in the surface of the glass superimposed on an identical opacified image or design within the body of the glass, any one or all of which can be produced in a single glass article.

The accompanying drawing illustrates articles made in accordance with the invention.

Fig. 1 is a plan view of a glass panel 10 in which light-diffusing or opacifying microscopic crystallites of lithium disilicate are precipitated in the glass to form a white opaque design comprising block letters 11, 12 and 13, the glass being otherwise clear and colorless.

Figure 1:
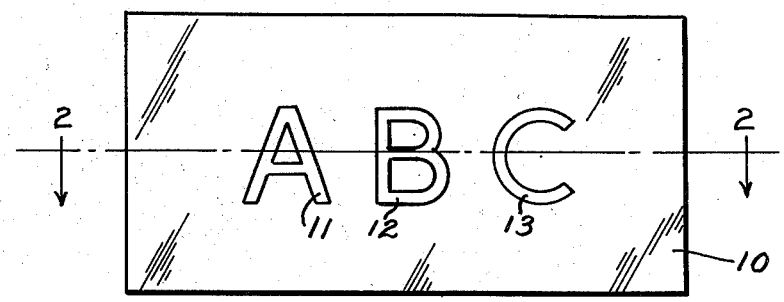
Figure 2:
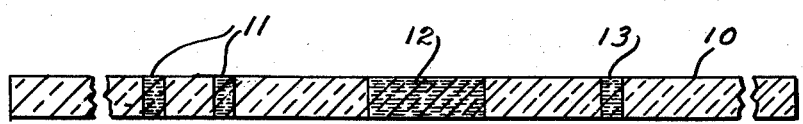
Fig. 2 is a sectional view on an enlarged scale on line 2—2 of Fig. 1 showing that the opacifying crystallites forming the design are present throughout the thickness of the glass so that the design is three-dimensional and extends completely through the glass panel.
Figure 3:
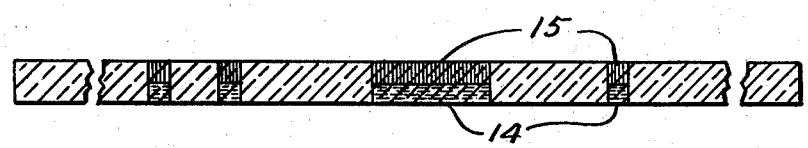
Fig. 3 is an enlarged sectional view of a glass panel similar to that shown in Fig. 2 and containing a design comprising block letters as in Fig. 2 which are opaque white in the section designated 14 at the back of the panel, and are a transparent red color in the section designated 15 at the front of the panel.

The following batches in parts by weight are given as examples to illustrate but not to limit my invention:

|  | 1 | 2 | 3 | 4 | 5 | 6 | 7 |
|---|---|---|---|---|---|---|---|
| $SiO_2$ | 100 | 100 | 100 | 100 | 100 | 100 | 100 |
| $Li_2CO_3$ | 34.4 | 32 | 41 | 39 | 32 | 37.1 | 39.4 |
| $Na_2CO_3$ | 1.9 |  |  | 1.9 |  |  | 3.2 |
| $NaNO_3$ | 3.2 |  | 3.8 | 1.7 |  |  |  |
| $CeO_2$ | .04 |  | .047 | .024 |  | .04 | .046 |
| Au | .0093 | .0047 | .016 |  |  |  |  |
| $Al(OH)_3$ |  | 7.1 | 4.3 | 4.2 | 7.1 |  | 4.2 |
| $Sb_2O_3$ |  | .014 |  |  |  |  |  |
| $CaCO_3$ |  |  | 24.3 |  |  |  |  |
| $SnO_2$ |  |  | .016 |  |  |  | .032 |
| $BaCO_3$ |  |  |  | 16 |  |  | 16 |
| $Na_2SiF_6$ |  |  |  | .56 |  |  |  |
| AgCl |  |  |  | .11 | .09 | .09 |  |
| $Li_2SO_4$ |  |  |  |  |  | 4.2 |  |
| CuO |  |  |  |  |  |  | .11 |
| $NH_4Cl$ |  |  |  |  |  |  | 2.1 |

When the above batches are melted in the usual manner and fabricated they produce substantially transparent glasses which, when exposed to short wave radiations and subsequently reheated, will become opacified in the exposed areas but will remain unchanged in the unexposed areas.

The proper time of exposure and subsequent heat treatment of the new glasses will depend upon the content of sensitizing metal, the character and intensity of the light source and the color effects desired. In general, when plates of glass made from the above compositions are exposed from 1 to 10 minutes, either directly or through a suitable photographic negative at a distance of 14 inches from a 60 ampere carbon arc using "C" carbon electrodes (manufactured by The National Carbon Company) and are subsequently heated for 10 minutes to an hour or more at 540° to 600° C., an opacification will be developed in the irradiated area of the glass while the unexposed portion will remain clear. If the exposure is made through a photographic negative, the opacification will form a positive image in minute detail in the glass. More specifically for example, composition 1 will develop a pink opal with a 10 minute exposure followed by heating for a few minutes at 600° C. Composition 6 will develop a yellow opal under the same conditions. Composition 7 will develop a white opal when exposed for 5 minutes and heated at 600° C. By increasing the time of exposure of composition 7 or by increasing its content of reducing agent, $NH_4Cl$, the opacified area will acquire a reddish color.

The effect of the irradiation and the image produced by heating the irradiated glass extend from the surface into the glass usually to a depth of 1 mm. to 5 mm. or more, depending upon the time and intensity of exposure and the content of sensitizing metal and being greater as the exposure or the sensitizing metal content is increased.

X-ray diffraction patterns of the new glasses after irradiation and heat treatment show that crystals of lithium disilicate are present in the opacified areas but are not present in the clear or unopacified areas. Such crystals are microscopic in size and are precipitated during the heat treatment.

Ultraviolet emitting lamps, such as the carbon arc or the quartz mercury arc, are convenient sources of radiations which are effective for my purpose, but treatments with X-rays, radioactive radiations and other sources of radiations shorter than 400 millimicrons are included within the scope of the present invention.

The new glasses are useful for many purposes such as: illuminating ware of various kinds, signalling devices, headlights, windows, etc., in which transverse, opaque or opalescent ribbons within the otherwise clear glass are employed as louvres to transmit direct light in some directions but to cut off or transmit only diffused light in others; illuminated decorative photographs, block-letter signs, etc., wherein three-dimensional light-scattering images are employed to produce unique effects with oblique illumination; photographic opal designs in glass tableware; durable, permanent images for projection, as in lantern slides. In making such articles, the desired designs, transverse louvres, images, etc., are produced in the glass by irradiation thereof through appropriate photographic negatives followed by uniformly heating the glass throughout, as set forth above.

The term "silicate glass," as used in the claims, means a glass prepared by fusion of raw glass-making materials containing, on the oxide basis, a major proportion of silica, a minor proportion of lithium oxide, preferably containing up to 10% of another alkali metal oxide such as sodium oxide, or up to 35% of BaO, or up to 10% of an oxide of another metal of the second periodic group, or up to 10% of alumina, but being free of constituents which inhibit photosensitivity including compounds of arsenic, lead, thallium, vanadium, uranium, iron, manganese and selenium.

I claim:

1. A photosensitive glass consisting essentially of a silicate glass containing, on the oxide basis by weight, 10% to 25% $Li_2O$ and the indicated proportion of a photosensitive metal selected from the group consisting of 0.004% to 0.05% of gold computed as Au, 0.025% to 0.3% of silver computed as AgCl and 0.04% to 1% of copper computed as $Cu_2O$.

2. A photosensitive glass consisting essentially of a silicate glass containing, on the oxide basis by weight, 10% to 25% $Li_2O$ and the indicated proportion of a photosensitive metal selected from the group consisting of 0.004% to 0.05% of gold computed as Au, 0.025% to 0.3% of silver computed as AgCl and 0.04% to 1% of copper computed as $Cu_2O$, and $CeO_2$ in an amount up to 0.05%.

3. A photosensitive glass consisting essentially of a silicate glass containing, on the oxide basis by weight, 10% to 25% $Li_2O$ and the indicated proportion of a photosensitive metal selected from the group consisting of 0.004% to 0.05% of gold computed as Au, 0.025% to 0.3% of silver computed at AgCl and 0.04% to 1% of copper computed at $Cu_2O$, and $SnO_2$ in an amount up to 0.03%.

4. A photosensitive glass consisting essentially of a silicate glass containing, on the oxide basis by weight, 10% to 25% $Li_2O$ and the indicated proportion of a photosensitive metal selected from the group consisting of 0.004% to 0.05% of gold computed as Au, 0.025% to 0.3% of silver computed as AgCl and 0.04% to 1% of copper computed as $Cu_2O$, and $Sb_2O_3$ in an amount up to 0.03%.

5. A photosensitive glass consisting essentially of a silicate glass containing, on the oxide basis by weight, 10% to 25% $Li_2O$ and the indicated proportion of a photosensitive metal selected from the group consisting of 0.004% to 0.05% of gold computed as Au, 0.025% to 0.3% of silver computed as AgCl and 0.04% to 1% of copper computed as $Cu_2O$, $CeO_2$ in an amount up to 0.05% and $SnO_2$ in an amount up to 0.03%.

6. A photosensitive glass consisting essentially of an oxidized silicate glass containing, on the oxide basis by weight, 55% to 75% $SiO_2$, 10% to 25% $Li_2O$, 3% to 35% BaO, 0.004% to 0.05% of gold computed as Au, and $CeO_2$ in an amount up to 0.05%.

7. A photosensitive glass consisting essentially of an oxidized silicate glass containing, on the oxide basis by weight, 55% to 75% $SiO_2$, 10% to 25% $Li_2O$, 3% to 35% BaO, 0.025% to 0.3% of silver computed as AgCl, and $CeO_2$ in an amount up to 0.05%.

8. A photosensitive glass consisting essentially of a reduced silicate glass containing, on the oxide basis by weight, 55% to 75% $SiO_2$, 10% to 25% $Li_2O$, 3% to 35% BaO, 0.04% to 1% of copper computed as $Cu_2O$, and $CeO_2$ in an amount up to 0.05%.

9. An article comprising a body of irradiated substantially colorless photosensitive glass consisting essentially of a silicate glass containing, on the oxide basis by weight, 10% to 25% $Li_2O$ and the indicated proportion of a photosensitive metal selected from the group consisting of 0.004% to 0.05% of gold computed as Au, 0.025% to 0.3% of silver computed as AgCl and 0.04% to 1% of copper computed as $Cu_2O$, said glass body containing within its mass a predetermined latent image capable of being developed, by uniform heating of the entire glass body, into a visible opacified image exhibiting photographic detail and comprising light-diffusing crystallites of lithium disilicate.

10. An article comprising a body of irradiated substantially colorless photosensitive glass consisting essentially of a silicate glass containing, on the oxide basis by weight, 10% to 25% $Li_2O$, the indicated proportion of a photosensitive metal selected from the group consisting of 0.004% to 0.05% of gold computed as Au, 0.025% to 0.3% of silver computed as AgCl and 0.04% to 1% of copper computed as $Cu_2O$, and $CeO_2$ in an amount up to 0.05%, said glass body containing within its mass a predetermined latent image capable of being developed, by uniform heating of the entire glass body, into a visible opacified image exhibiting photographic detail and comprising light-diffusing crystallites of lithium disilicate.

11. An article comprising a body of irradiated substantially colorless photosensitive glass consisting essentially of a silicate glass containing, on the oxide basis by weight, 55% to 75% $SiO_2$, 10% to 25% $Li_2O$, 3% to 35% BaO, the indicated proportion of a photosensitive metal selected from the group consisting of 0.004% to 0.05% of gold computed as Au, 0.025% to 0.3% of silver computed as AgCl and 0.04% to 1% of copper computed as $Cu_2O$, and $CeO_2$ in an amount up to 0.05%, said glass body containing within its mass a predetermined latent photographic image capable of being developed, by uniform heating of the entire glass body, into a visible opacified image exhibiting photographic detail and comprising light-diffusing crystallites of lithium disilicate.

12. An article comprising a body made of a photosensitive glass consisting essentially of a silicate glass containing, on the oxide basis by weight, 10% to 25% $Li_2O$ and the indicated proportion of a photosensitive metal selected from the group consisting of 0.004% to 0.05% of gold computed as Au, 0.025% to 0.3% of silver computed as AgCl and 0.04% to 1% of copper computed as $Cu_2O$, selected portions of said glass body containing light-diffusing crystallites of lithium disilicate in quantity and arrangement to form within its mass a heat-stable opaque image exhibiting photographic detail.

13. An article comprising a body made of a photosensitive glass consisting essentially of a silicate glass containing, on the oxide basis by weight, 10% to 25% $Li_2O$, the indicated proportion of a photosensitive metal selected from the group consisting of 0.004% to 0.05% of gold computed as Au, 0.025% to 0.3% of silver computed as AgCl and 0.04% to 1% of copper computed as $Cu_2O$, and $CeO_2$ in an amount up to 0.05%, selected portions of said glass body containing light-diffusing crystallites of lithium disilicate in quantity and arrangement to form within its mass a heat-stable opaque image exhibiting photographic detail.

14. An article comprising a body made of a photosensitive glass consisting essentially of an oxidized silicate glass containing, on the oxide basis by weight, 55% to 75% $SiO_2$, 10% to 25% $Li_2O$, 3% to 35% BaO, 0.004% to 0.05% of gold computed as Au, and $CeO_2$ in an amount up to 0.05%, selected portions of said glass body containing light-diffusing crystallites of lithium disilicate in quantity and arrangement to form within its mass a heat-stable opaque image exhibiting photographic detail.

15. An article comprising a body made of a photosensitive glass consisting essentially of an oxidized silicate glass containing, on the oxide basis by weight, 55% to 75% $SiO_2$, 10% to 25% $Li_2O$, 3% to 35% BaO, 0.025% to 0.3% of silver computed as AgCl, and $CeO_2$ in an amount up to 0.05%, selected portions of said glass body containing light-diffusing crystallites of lithium disilicate in quantity and arrangement to form within its mass a heat-stable opaque image exhibiting photographic detail.

16. An article comprising a body made of a photosensitive glass consisting essentially of a reduced silicate glass containing, on the oxide basis by weight, 55% to 75% $SiO_2$, 10% to 25% $Li_2O$, 3% to 35% BaO, 0.04% to 1% of copper computed as $Cu_2O$, and $CeO_2$ in an amount up to 0.05%, selected portions of said glass body containing light-diffusing crystallites of lithium disilicate in quantity and arrangement to form within its mass a heat-stable opaque image exhibiting photographic detail.

17. An article comprising a body made of a photosensitive glass consisting essentially of a silicate glass containing, on the oxide basis by weight, 10% to 25% $Li_2O$, the indicated proportion of a photosensitive metal selected from the group consisting of 0.004% to 0.05% of gold computed as Au, 0.025% to 0.3% of silver computed as AgCl and 0.04% to 1% of copper computed as $Cu_2O$, and $SnO_2$ in an amount up to 0.03%, selected portions of said glass body containing light-diffusing crystallites of lithium disilicate in quantity and arrangement to form within its mass a heat-stable opaque image exhibiting photographic detail.

18. An article comprising a body made of a photosensitive glass consisting essentially of a silicate glass containing, on the oxide basis by weight, 10% to 25% $Li_2O$, the indicated proportion of a photosensitive metal selected from the group consisting of 0.004% to 0.05% of gold computed as Au, 0.025% to 0.3% of silver computed as AgCl and 0.04% to 1% of copper computed as $Cu_2O$, and $Sb_2O_3$ in an amount up to 0.03%, selected portions of said glass body containing light-diffusing crystallites of lithium disilicate in quantity and arrangement to form within its mass a heat-stable opaque image exhibiting photographic detail.

19. An article comprising a body made of a photosensitive glass consisting essentially of a silicate glass containing, on the oxide basis by weight, 10% to 25% $Li_2O$, the indicated proportion of a photosensitive metal selected from the group consisting of 0.004% to 0.05% of gold computed as Au, 0.025% to 0.3% of silver computed as AgCl and 0.04% to 1% of copper computed as $Cu_2O$, $CeO_2$ in an amount up to 0.05% and $SnO_2$ in an amount up to 0.03%, selected portions of said glass body containing light-diffusing crystallites of lithium disilicate in quantity and arrangement to form within its mass a heat-stable opaque image exhibiting photographic detail.

20. An article comprising a body made of a photosensitive glass consisting essentially of a silicate glass containing, on the oxide basis by weight, 10% to 25% $Li_2O$ and the indicated proportion of a photosensitive metal selected from the group consisting of 0.004% to 0.05% of gold computed as Au, 0.025% to 0.3% of silver computed as AgCl and 0.04% to 1% of copper computed as $Cu_2O$, selected portions of said glass body containing light-diffusing crystallites of lithium disilicate in quantity and arrangement to form within its mass a heat-stable opaque image exhibiting photographic detail, and superimposed on said opaque image and in register therewith a colored unopacified image.

21. The method of making a glass article which comprises forming an article of a photosensitive glass consisting essentially of a silicate glass containing, on the oxide basis by weight, 10% to 25% $Li_2O$ and the indicated proportion of a photosensitive metal selected from the group consisting of 0.004% to 0.05% of gold computed as Au, 0.025% to 0.3% of silver computed as AgCl, and 0.04% to 1% of copper computed as $Cu_2O$, exposing an area of the article to short-wave radiations and thereafter heating the article uniformly for a time and at a temperature sufficient to cause precipitation of lithium disilicate crystallites in the exposed area.

STANLEY DONALD STOOKEY.

REFERENCES CITED

The following references are of record in the file of this patent:

UNITED STATES PATENTS

| Number | Name | Date |
|---|---|---|
| 2,049,765 | Fischer | Aug. 4, 1936 |
| 2,144,943 | Sharp et al. | Jan. 24, 1939 |
| 2,237,042 | Truby | Apr. 1, 1941 |
| 2,326,012 | Dalton | Aug. 3, 1943 |
| 2,422,472 | Dalton | June 17, 1947 |

Certificate of Correction

Patent No. 2,515,940                                July 18, 1950

STANLEY DONALD STOOKEY

It is hereby certified that error appears in the printed specification of the above numbered patent requiring correction as follows:

Column 2, line 32, for "CuO" read $Cu_2O$;

and that the said Letters Patent should be read as corrected above, so that the same may conform to the record of the case in the Patent Office.

Signed and sealed this 7th day of November, A. D. 1950.

[SEAL]

THOMAS F. MURPHY,
*Assistant Commissioner of Patents.*